United States Patent [19]

Gerber

[11] Patent Number: 5,344,367
[45] Date of Patent: Sep. 6, 1994

[54] INFEED PLATE FOR AN AXIAL AGRICULTURAL COMBINE

[75] Inventor: Merle R. Gerber, Moline, Ill.

[73] Assignee: Deere & Company, Moline, Ill.

[21] Appl. No.: 41,074

[22] Filed: Mar. 31, 1993

[51] Int. Cl.⁵ .................................................. A01F 12/10
[52] U.S. Cl. ......................................... 460/68; 460/70
[58] Field of Search .................. 460/68, 70, 63, 69; 56/14.6

[56] References Cited

U.S. PATENT DOCUMENTS

| | | |
|---|---|---|
| 4,087,953 | 5/1978 | Wilson et al. ............... 460/70 X |
| 4,269,200 | 5/1981 | Gorsler . |
| 4,291,709 | 9/1981 | Weber et al. . |
| 4,328,815 | 5/1982 | Rowland-Hill . |
| 4,665,929 | 5/1987 | Helm . |
| 4,875,890 | 10/1989 | Margerum et al. ............. 460/68 |

Primary Examiner—Terry Lee Melius

[57] ABSTRACT

An improved infeed plate more evenly distributes harvested crop material as it is transferred from a feederhouse to an axial rotor. Crop on one side of the infeed plate is curled into the bottom of the rotor by a conical section. Crop on the other side of the rotor is introduced to the top of the rotor by a ramp. Crop in the middle section is directed to the bottom of the rotor. The ramp section is provided with an upwardly extending rim.

20 Claims, 5 Drawing Sheets

INFEED PLATE FOR AN AXIAL AGRICULTURAL COMBINE

BACKGROUND OF THE INVENTION

1. Field of the Invention

The present invention is directed to an unsymmetrical infeed plate for directing harvested crop to an axial flow rotor.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

Axial flow combines have one or two large rotors arranged along the longitudinal axis of the machine for threshing and separating the harvested crop material. Harvested crop material is directed to the axial rotors by a feederhouse. Most feederhouses transport the harvested crop in a thin mat extending across the width of the feederhouse.

How the planar movement of this thin mat of crop material is introduced into the axial flow rotor is critical to the efficiency of the combine. An unsymmetrical infeed plate was proposed in U.S. Pat. No. 4,665,929. This proposed inlet structure comprises a substantially planar infeed plate wherein one side of the plate is provided with a steeper ramp. In addition, mounting crop dividing guide vanes on the infeed plate has also been proposed, see U.S. Pat. No. 4,328,815.

SUMMARY

It is an object of the present invention to provide an improved unsymmetrical infeed plate which more efficiently introduces the crop mat into the rotor housing.

It is a feature of the present invention that the transverse upstream section of the infeed plate is provided with a conical section and the transverse downstream section is provided with a curved ramp.

It is another feature of the present invention that the ramp is provided with an upwardly extending rim.

Harvested crop from the feederhouse is directed to a transverse beater which propels the crop material across the infeed plate to the axial rotor. In the disclosed embodiment the rotor is rotated counterclockwise when viewed from the front of the combine. The left side of the infeed plate when viewed from the front of the combine comprises a transverse upstream section of the infeed plate, and the right side comprises a transverse downstream section. If the rotor was rotated clockwise these sections would be reversed.

As the rotor rotates counterclockwise, harvested crop material propelled up the transverse upstream section of the infeed plate is curled towards the rotor and is primarily directed to the bottom of the rotor by a conical section. Crop material propelled up the transverse downstream section is directed up by a steeper curved ramp to the top of the rotor. The unsymmetrical configuration of the infeed plate introduces the crop mat to the axial rotor so that it is more easily rotated by the rotor and taken into the rotor housing.

The ramp is provided with an upwardly extending rim. The rim forms a shallow zone in its shadow. Harvested crop material located in this zone is allowed to slide up a semi-cylindrical plate to feed the rotor. In addition, the rim substantially limits the movement of crop material laterally across the infeed plate. More specifically the counterclockwise rotation of the rotor tends to drive the crop material to the transverse downstream section of the infeed plate. The substantially reduces this tendency in the crop mat. As such the rim provides for a more uniform loading of the rotor.

The infeed plate forces the crop material into one of three flow paths. Each flow path introduces the crop mat to different sections of the rotor, thereby more uniformly loading the rotor. That portion of the crop mat on the transverse upstream side furthest to the outside is forced into the conical section and up the adjoining sidewall and is introduced to the bottom of the rotor. The portion of the crop mat in the middle of the infeed plate flows up the semi-cylindrical plate to the side of the rotor. The crop material furthest to the outside on the transverse downstream section flows up the ramp and the oblique curved ramp and is introduced to the top of the rotor. The three streams more evenly introduce the crop mat to the rotor.

DETAILED DESCRIPTION

Figure 1:
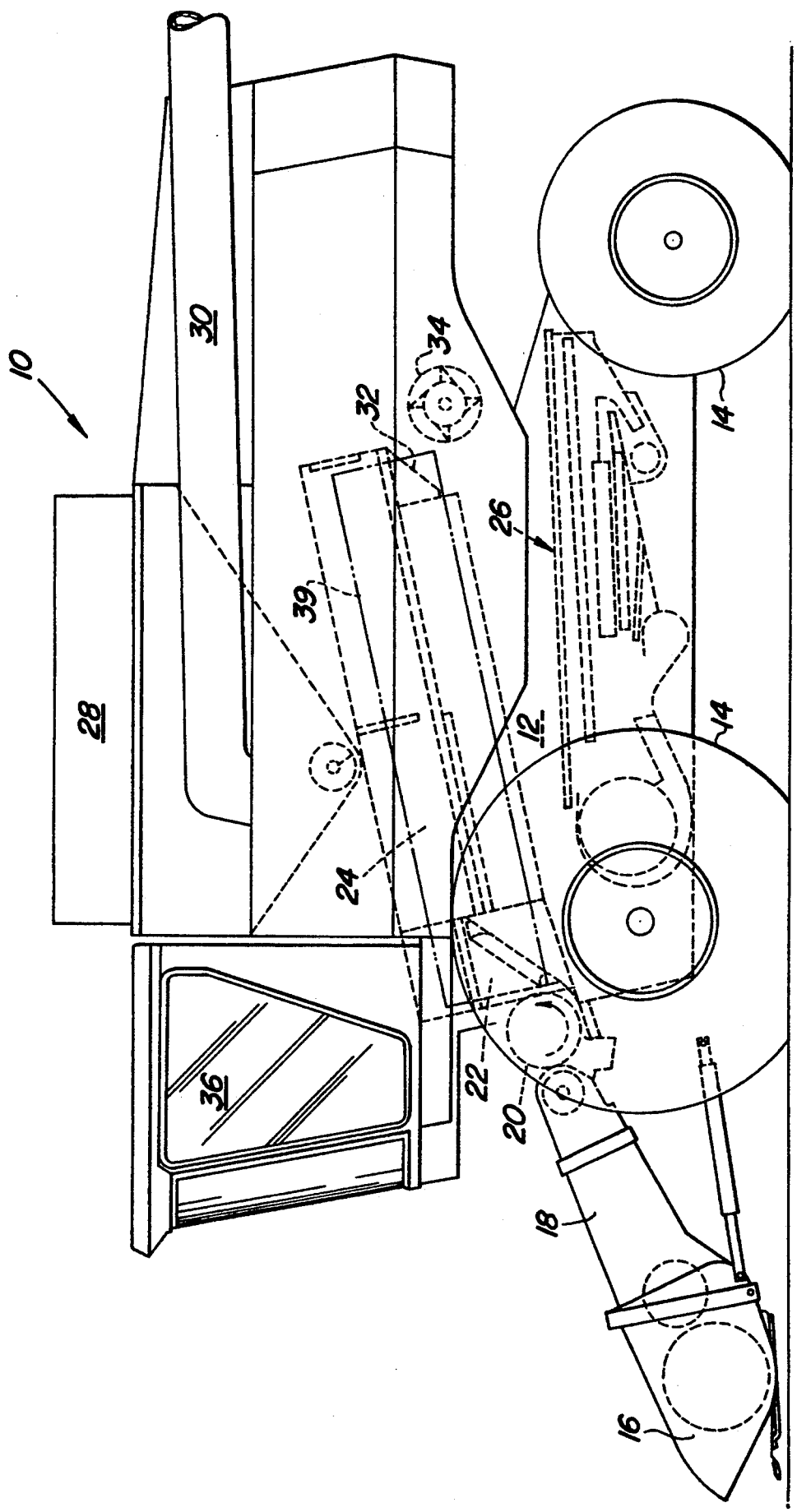
FIG. 1 is a semi-schematic side view of an axial flow agricultural combine.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through an inlet transition section 22 to the axial crop processing unit 24.

The crop processing unit threshes and separates the harvested crop material. Grain and chaff fall through grates on the bottom of the unit 24 to cleaning system 26. The cleaning system 26 removes the chaff and directs the clean grain to a clean grain elevator (not shown). The clean grain elevator deposits the clean grain in grain tank 28. The clean grain in the tank can be unloaded into a grain cart or truck by unloading auger 30.

Threshed and separated straw in discharged from the axial crop processing unit through outlet 32 to discharge beater 34. The discharge beater in turn propels the straw out the rear of the combine. The operation of the combine is controlled from operator's cab 36.

Figure 2:
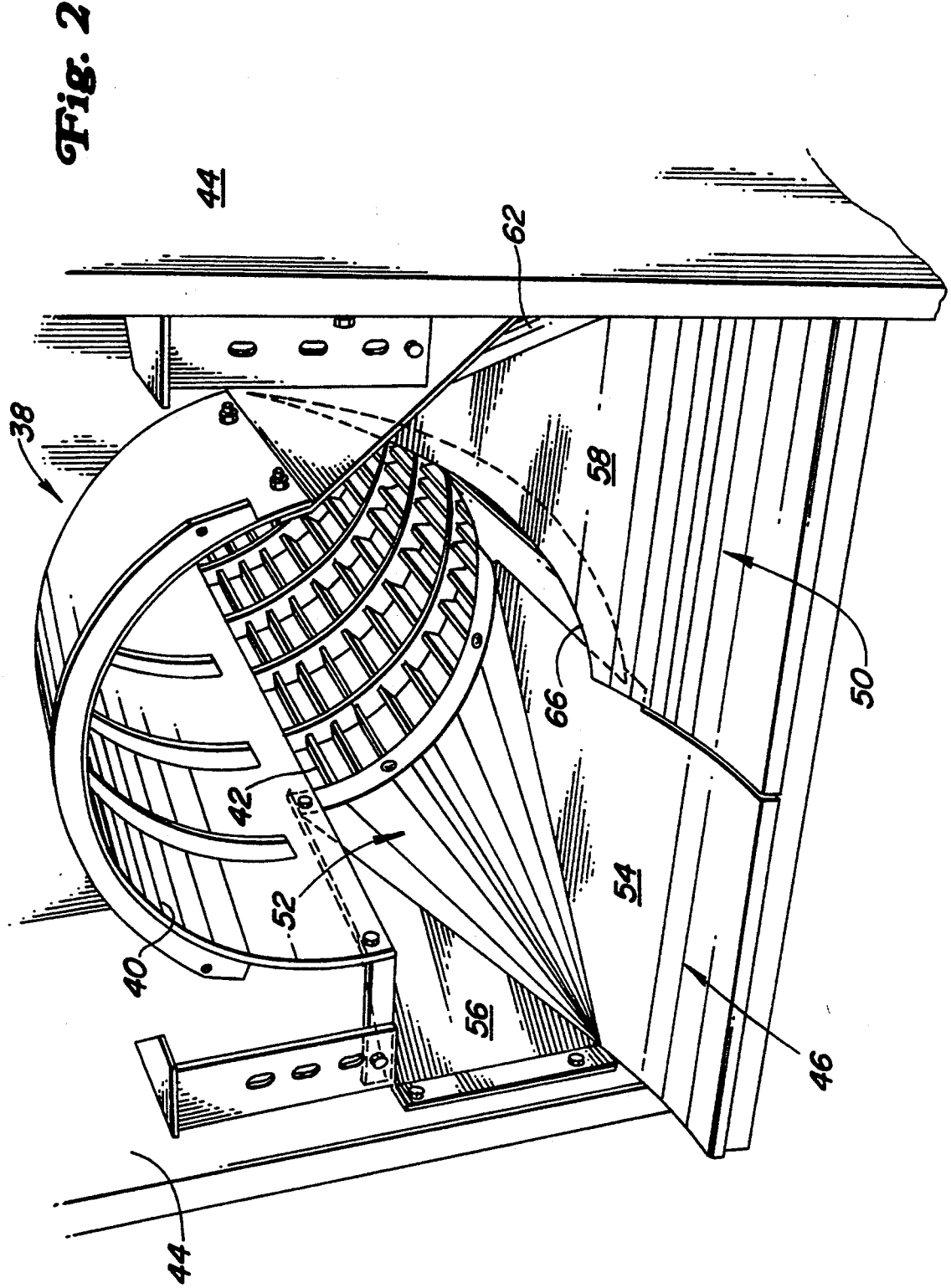
FIG. 2 is a perspective view of the infeed plate of the present invention.
Figure 3:
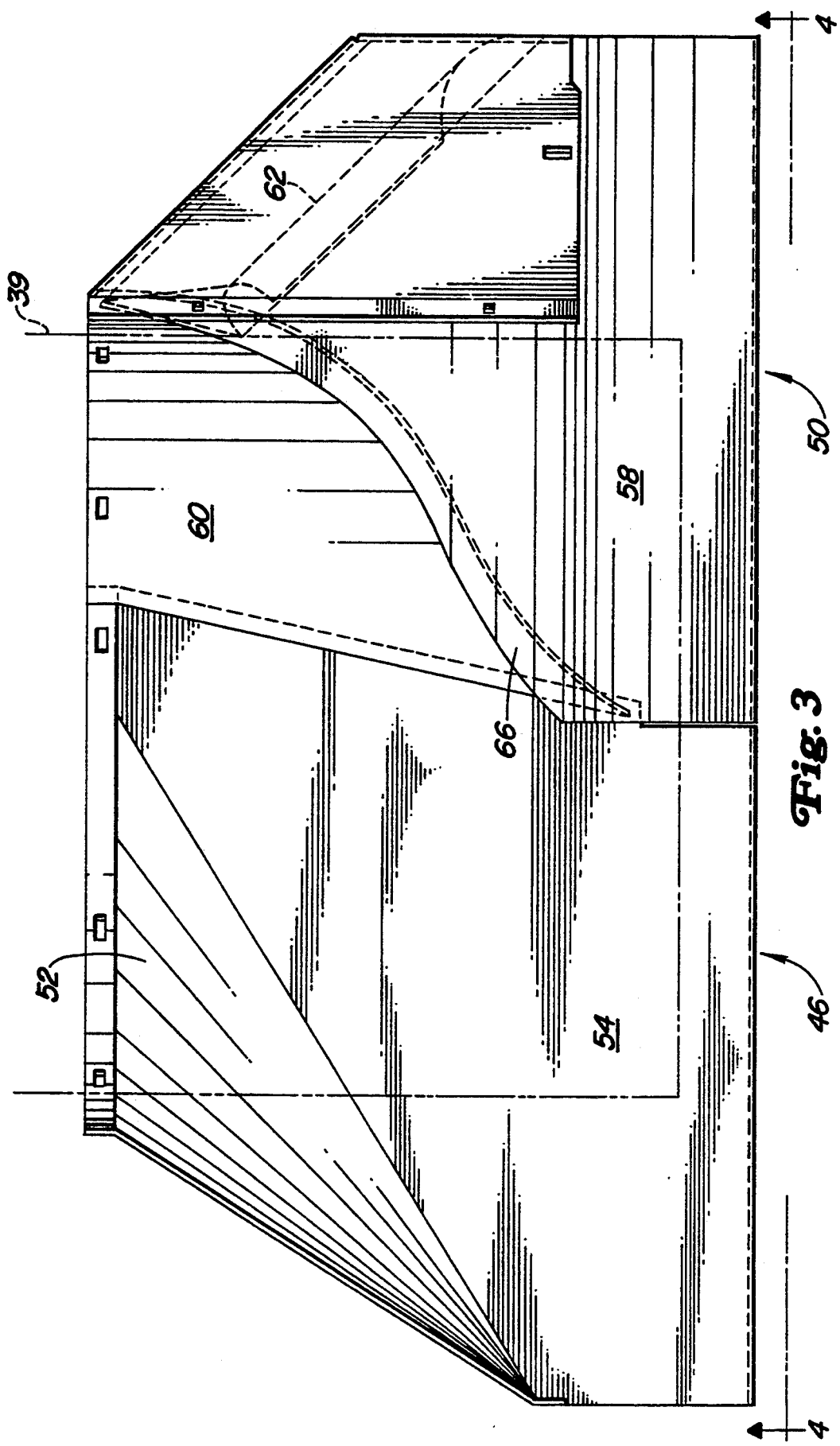
FIG. 3 is a top view of the infeed plate.
Figure 4:
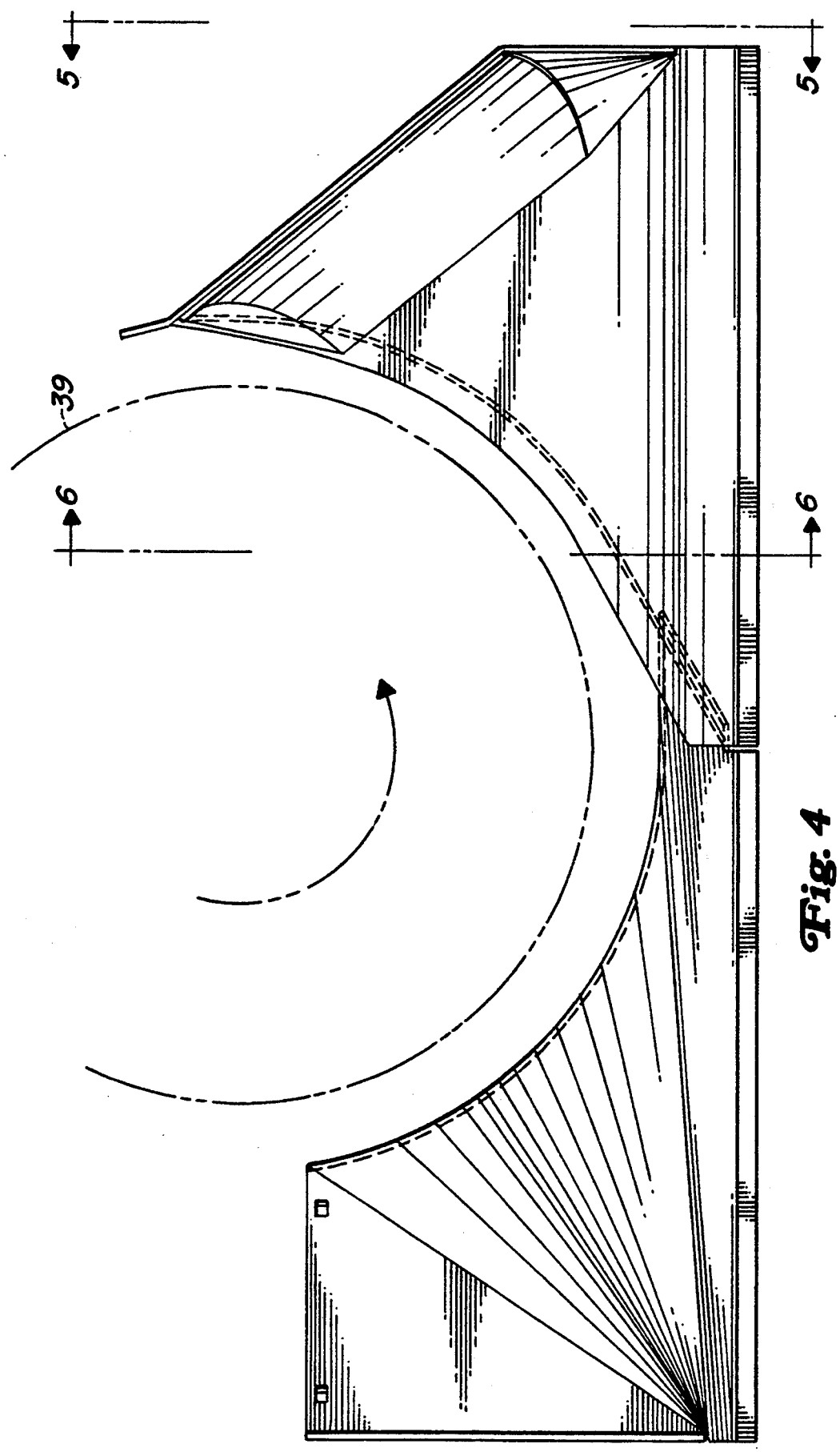
FIG. 4 is a front view of the infeed plate.
Figure 5:
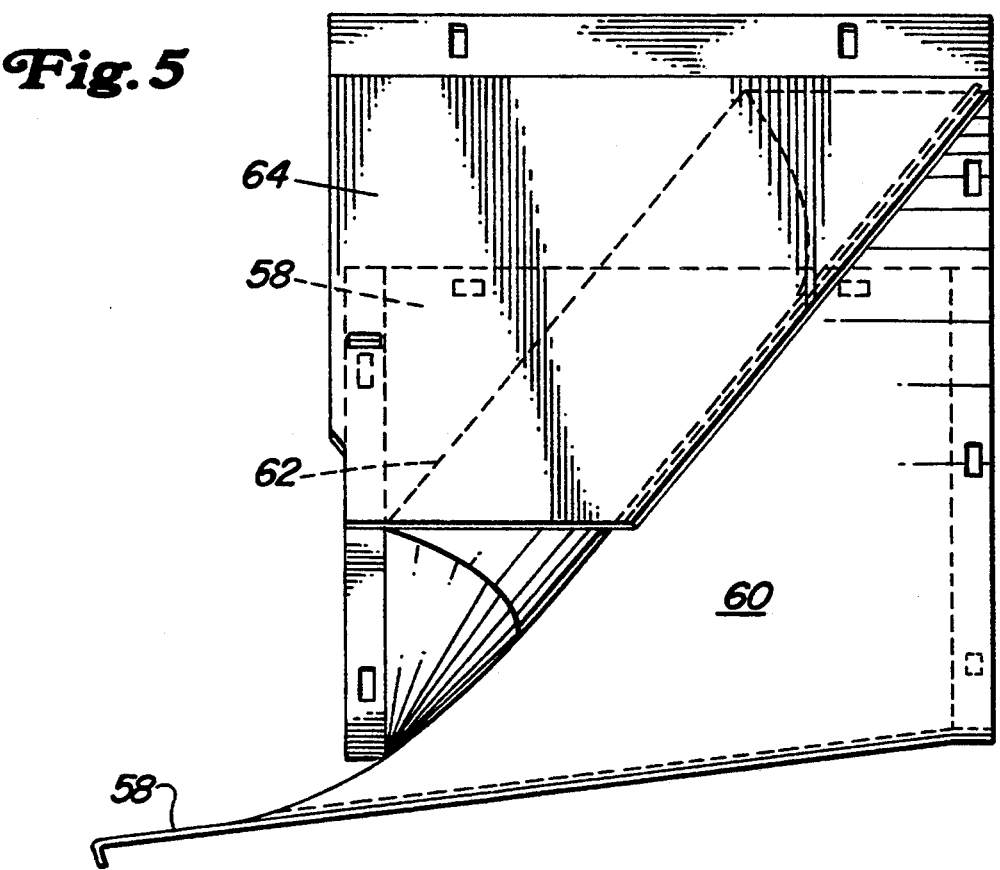
FIG. 5 is an side view taken along line 5—5 in FIG. 4.
Figure 6:
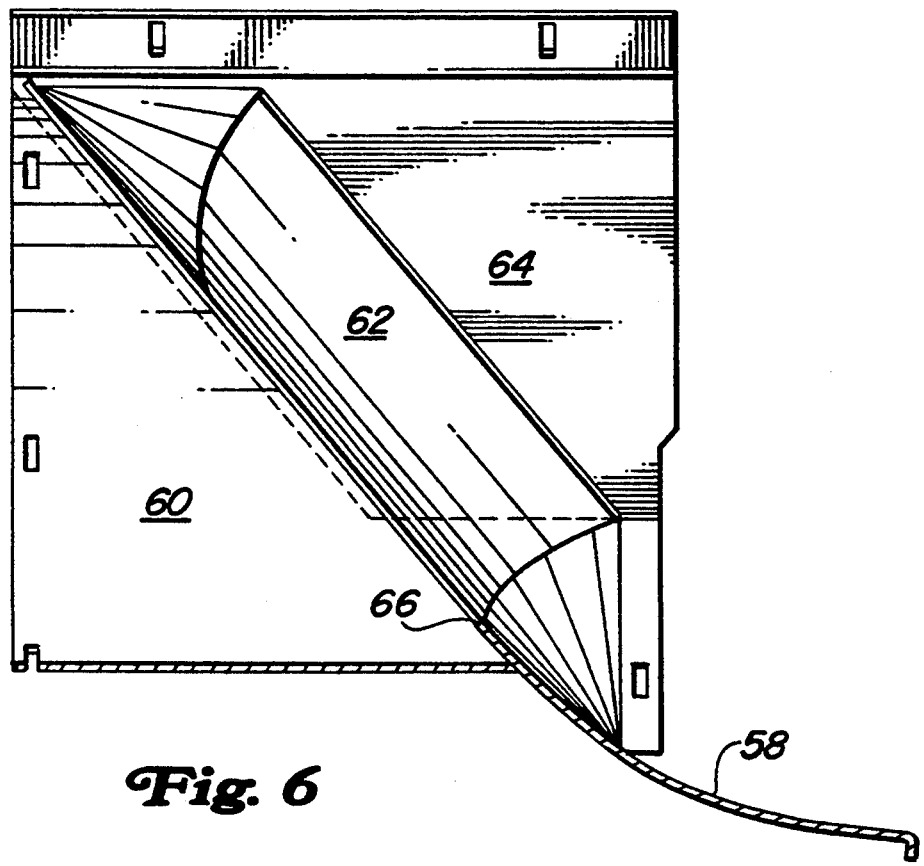
FIG. 6 is a cross sectional view taken along line 6—6 in FIG. 4.

The axial crop processing unit comprises a cylindrical rotor housing 38 and a rotor 39 located inside the housing 38. The rotor housing has a top portion 40 and a bottom portion 42. The bottom portion is provided with grates through which grain and chaff fall to the cleaning system. As shown in FIG. 2, the rotor housing and the inlet transition section are positioned between the sidesheets 44 of the combine. The sidesheets forming part of the supporting structure of the combine.

The inlet transition section 22 is best illustrated in FIGS. 2–6. The front portion of the rotor projects into the inlet transition section. This section comprises an infeed plate having two sections: a transverse upstream section 46 and a transverse downstream section 50. The transverse upstream section is provided with a conical section 52 which starts curling the thin mat of harvested crop material and introduces the crop layer on that side of the infeed plate to the bottom of the rotor. The beater propelled crop layer on the transverse upstream side runs along an inclined plate 54 until it contacts the conical section 52. The inclined plate extends from the transverse beater to the conical section. A triangular converging side plate 56 and a horizontal triangular top plate (not shown) further constrain the flow of the crop material to the rotor.

The transverse downstream section is provided with a curved ramp 58 that curves upwardly towards the rotor. The curved ramp is steeper than the inclined plate 54. Immediately behind the ramp is a semi-cylindrical plate 60 which essentially forms part of the rotor housing. The crop mat is further constrained by oblique curved ramp 62 that is mounted between ramp 58 and planar side plate 64. Crop material along the outside edge of ramp 58 is thrown up ramp 58 by the beater and engages oblique ramp 62 which throws the crop material on top of the rotor.

The ramp is provided with an upward extending rim 66 that forms a shallow dead zone behind the ramp. Crop material trapped in this zone slides up the semi-cylindrical plate 60 and is transported to the rotor. The rim 66 also keeps crop material in section 46 from mixing with crop material in section 50.

In addition to providing this shallow dead zone behind the ramp, the rim also substantially limits the movement of crop material, propelled by the rotor from moving from the transverse upstream section to the transverse downstream section.

The present invention provides a passive system for efficiently introducing a thin crop mat to an axial crop processing unit. As such it should not be limited by the above-described embodiment, but should be limited solely by the claims that follow.

I claim:

1. An axial flow agricultural combine comprising:
a supporting structure;
ground engaging means extending from the supporting structure for transporting the supporting structure across a field;
an axial rotor housing having a forward open inlet for receiving harvested crop material, grates through which threshed and separated grain is removed from the housing, and a rear open outlet through which non-grain crop material is removed from the housing;
an axial rotor for threshing and separating a harvested crop, the rotor being housed in the housing;
a feederhouse through which harvested crop material is transported to the housing;
a transverse beater being located between the feederhouse and the housing for directing harvested crop material to the housing;
an inlet transition section located between the beater and the inlet of the housing, the inlet transition section having a transverse upstream section and a transverse downstream section, the transverse upstream section is provided with an inclined plate that extends from the beater to a conical section directing crop to the rotor, the transverse downstream section having a ramp that is steeper than the inclined plate of the transverse upstream section, the ramp is provided with an upwardly extending rim.

2. An axial agricultural combine as defined by claim 1 wherein the ramp is upwardly curved towards the rotor.

3. An axial agricultural combine as defined by claim 2 wherein the transverse downstream section is further provided with a converging side plate.

4. An axial agricultural combine as defined by claim 3 wherein an oblique ramp is positioned between the side plate and the ramp.

5. An axial agricultural combine as defined by claim 4 wherein the transverse upstream section is provided with a converging side plate.

6. An axial flow agricultural combine comprising:
a supporting structure;
ground engaging means extending from the supporting structure for transporting the supporting structure across a field;
an axial rotor housing having a forward open inlet for receiving harvested crop material, grates through which threshed and separated grain is removed from the housing, and a rear open outlet through which non-grain crop material is removed from the housing;
an axial rotor for threshing and separating a harvested crop, the rotor being housed in the housing;
a feederhouse through which harvested crop material is transported to the housing;
a transverse beater being located between the feederhouse and the housing for directing harvested crop material to the housing;
an inlet transition section located between the beater and the inlet of the housing, the inlet transition section having a transverse upstream section and a transverse downstream section, the transverse upstream section is provided with an inclined plate that is inclined upwardly to the rotor from the transverse beater, the transverse downstream section having a ramp that is steeper than the inclined plate of the transverse upstream section, the ramp being provided with an upwardly extending rim.

7. An axial agricultural combine as defined by claim 6 wherein the ramp is upwardly curved towards the rotor.

8. An axial agricultural combine as defined by claim 7 wherein the transverse downstream section is further provided with a converging side plate.

9. An axial agricultural combine as defined by claim 8 wherein an oblique ramp is positioned between the side plate and the ramp.

10. An axial agricultural combine as defined by claim 9 wherein the transverse upstream section is provided with a conical section that is positioned between the inclined plate and the rotor, the conical section directing crop material to the rotor.

11. An infeed plate for directing crop material to a rotor of an axial agricultural combine, the infeed plate comprising a transverse upstream section having an inclined plate, and a transverse downstream portion having a ramp that is steeper than the inclined plate, the ramp is provided with an upwardly extending rim.

12. An infeed plate as defined by claim 11 wherein the ramp is curved upwardly.

13. An infeed plate as defined by claim 12 wherein the transverse downstream section is further provided with a converging side plate.

14. An infeed plate as defined by claim 13 wherein an oblique ramp is positioned between the side plate and the ramp.

15. An infeed plate as defined by claim 14 wherein the transverse upstream section is provided with a conical section adjacent to the inclined plate.

16. An infeed plate as defined by claim 15 wherein the transverse upstream section is provided with a converging side plate.

17. An infeed plate for directing crop material to a rotor of an axial agricultural combine, the infeed plate comprising a transverse upstream section having an inclined plate and a conical section adjoining the inclined plate, and a transverse downstream portion having a ramp that is steeper than the inclined plate, the ramp is provided with a upwardly extending rim.

18. An infeed plate as defined by claim 17 wherein the ramp is upwardly curved towards the rotor.

19. An infeed plate as defined by claim 18 wherein the transverse downstream section is further provided with a converging side plate.

20. An infeed plate as defined by claim 19 wherein an oblique ramp is positioned between the side plate and the ramp.

* * * * *